(12) United States Patent
Annamalai (10) Patent No.: US 9,820,102 B2
(45) Date of Patent: *Nov. 14, 2017

(54) MOBILE DEVICE LOCATION DETERMINATION USING MICRONETWORKS

(71) Applicant: T-Mobile U.S.A., Inc., Bellevue, WA (US)

(72) Inventor: Magesh Annamalai, Dublin, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/213,330

(22) Filed: Jul. 18, 2016

(65) Prior Publication Data

US 2017/0019766 A1 Jan. 19, 2017

Related U.S. Application Data

(63) Continuation of application No. 14/225,361, filed on Mar. 25, 2014, now Pat. No. 9,398,418, which is a
(Continued)

(51) Int. Cl.
*H04W 4/02* (2009.01)
*H04W 4/22* (2009.01)
(Continued)

(52) U.S. Cl.
CPC ............ *H04W 4/025* (2013.01); *H04L 67/18* (2013.01); *H04W 4/02* (2013.01); *H04W 4/22* (2013.01);
(Continued)

(58) Field of Classification Search
CPC .................................................. H04W 64/00
See application file for complete search history.

(56) References Cited

U.S. PATENT DOCUMENTS 5,724,660 A 3/1998 Kauser et al.
6,002,679 A 12/1999 Liu et al.
(Continued)

FOREIGN PATENT DOCUMENTS

EM 2051556 4/2009
EP 1583374 A1 10/2005
(Continued)

OTHER PUBLICATIONS

"Enabler Release Definition for Secure UserPlane for Location," Candidate Version 1.0, Open Mobile Alliance, Jan. 22, 2007, 17 pages.
(Continued)

*Primary Examiner* — Muthuswamy Manoharan
(74) *Attorney, Agent, or Firm* — Perkins Coie LLP (57) ABSTRACT

A facility for determining the location of a mobile device when a location determination of a desired accuracy is desired. If available, the facility determines the location of the mobile device using a device-based technique or using a location determination technique that is accessible over a macronetwork. Macronetworks are networks that are designed to cover relatively large areas. If a location determination technique of desired accuracy is not available on the device or over a macronetwork, the facility attempts to use a location determination technique that is accessible over a micronetwork to determine the location of the mobile device. Micronetworks are networks that are designed to cover smaller areas. By forcing a switch from a macronetwork-based location determination technique to a micronetwork-based location determination technique, the facility ensures that a location determination is made for the mobile device of a desired accuracy, time to fix (TTF), and/or yield.

19 Claims, 5 Drawing Sheets

Related U.S. Application Data continuation of application No. 12/467,215, filed on May 15, 2009, now Pat. No. 8,718,592.

(51) Int. Cl.
*H04W 76/00* (2009.01)
*H04L 29/08* (2006.01)
*H04W 64/00* (2009.01)

(52) U.S. Cl.
CPC .......... *H04W 76/007* (2013.01); *H04W 64/00* (2013.01)

(56) References Cited

U.S. PATENT DOCUMENTS

| | | |
|---|---|---|
| 6,104,712 A | 8/2000 | Robert et al. |
| 6,119,012 A | 9/2000 | Amirijoo |
| 6,222,483 B1 | 4/2001 | Twitchell et al. |
| 6,249,252 B1 | 6/2001 | Dupray |
| 6,252,545 B1 | 6/2001 | Da et al. |
| 6,463,288 B1 | 10/2002 | Hayinis et al. |
| 6,542,819 B1 | 4/2003 | Kovacs et al. |
| 6,603,976 B1 | 8/2003 | Amirijoo et al. |
| 6,603,978 B1 | 8/2003 | Carlsson et al. |
| 6,665,611 B1 | 12/2003 | Oran et al. |
| 6,671,514 B1 | 12/2003 | Cedervall et al. |
| 6,690,659 B1 | 2/2004 | Ahmed et al. |
| 6,711,417 B1 | 3/2004 | Gorman et al. |
| 6,801,778 B2 | 10/2004 | Koorapaty et al. |
| 7,151,941 B2 | 12/2006 | Vänttinen et al. |
| 7,158,500 B2 | 1/2007 | Annamalai |
| 7,177,399 B2 | 2/2007 | Dawson et al. |
| 7,187,923 B2 | 3/2007 | Mousseau et al. |
| 7,194,354 B1 | 3/2007 | Oran et al. |
| 7,245,900 B1 | 3/2007 | Lamb et al. |
| 7,272,500 B1 | 9/2007 | Walker |
| 7,283,822 B2 | 10/2007 | Gallagher et al. |
| 7,304,985 B2 | 12/2007 | Sojka et al. |
| 7,313,143 B1 | 12/2007 | Bruno |
| 7,317,910 B2 | 1/2008 | Niemenmaa et al. |
| 7,336,668 B2 | 2/2008 | Adams |
| 7,336,962 B2 | 2/2008 | Levitan |
| 7,353,034 B2 | 4/2008 | Haney |
| 7,369,859 B2 | 5/2008 | Gallagher |
| 7,433,673 B1 | 10/2008 | Everson et al. |
| 7,436,789 B2 | 10/2008 | Caliskan et al. |
| 7,466,986 B2 | 12/2008 | Halcrow et al. |
| 7,577,431 B2 | 8/2009 | Jiang |
| 7,593,605 B2 | 9/2009 | King et al. |
| 7,606,555 B2 | 10/2009 | Walsh et al. |
| 7,610,011 B2 | 10/2009 | Albrett |
| 7,613,155 B2 | 11/2009 | Shim |
| 7,620,404 B2 | 11/2009 | Chesnais et al. |
| 7,640,008 B2 | 12/2009 | Gallagher et al. |
| 7,653,394 B2 | 1/2010 | McMillin |
| 7,664,494 B2 | 2/2010 | Jiang |
| 7,676,394 B2 | 3/2010 | Ramer et al. |
| 7,688,261 B2 | 3/2010 | DiEsposti |
| 7,714,778 B2 | 5/2010 | Dupray |
| 7,768,963 B2 | 8/2010 | Alizadeh-Shabdiz |
| 7,856,315 B2 | 12/2010 | Sheha et al. |
| 7,903,029 B2 | 3/2011 | Dupray |
| 7,904,096 B2 | 3/2011 | Shyr et al. |
| 7,949,326 B2 | 5/2011 | Gallagher et al. |
| 7,974,639 B2 | 7/2011 | Burroughs et al. |
| 8,116,291 B2 | 2/2012 | Annamalai et al. |
| 8,145,183 B2 | 3/2012 | Barbeau et al. |
| 8,213,957 B2 | 7/2012 | Bull et al. |
| 8,311,557 B2 | 11/2012 | Annamalai |
| 8,364,746 B2 | 1/2013 | Annamalai et al. |
| 8,369,266 B2 | 2/2013 | Jin et al. |
| 8,509,731 B2 | 8/2013 | Kholaif et al. |
| 8,571,043 B2 | 10/2013 | Horner |
| 8,693,454 B2 | 4/2014 | Annamalai et al. |
| 8,718,592 B2 | 5/2014 | Annamalai |
| 8,737,311 B2 | 5/2014 | Jin et al. |
| 8,908,664 B2 | 12/2014 | Caldwell et al. |
| 9,398,418 B2 | 7/2016 | Annamalai |
| 2002/0019698 A1 | 2/2002 | Vilppula et al. |
| 2002/0064141 A1 | 5/2002 | Sakakura |
| 2002/0077144 A1 | 6/2002 | Keller et al. |
| 2002/0123354 A1 | 9/2002 | Nowak |
| 2003/0009385 A1 | 1/2003 | Tucciarone et al. |
| 2003/0016648 A1 | 1/2003 | Lindsay et al. |
| 2003/0032404 A1 | 2/2003 | Wager et al. |
| 2003/0058844 A1 | 3/2003 | Sojka et al. |
| 2003/0074471 A1 | 4/2003 | Anderson et al. |
| 2003/0095069 A1 | 5/2003 | Stilp |
| 2003/0139182 A1 | 7/2003 | Bakkeby et al. |
| 2003/0216143 A1 | 11/2003 | Roese et al. |
| 2003/0222819 A1 | 12/2003 | Karr et al. |
| 2004/0062264 A1 | 4/2004 | Adams |
| 2004/0076157 A1 | 4/2004 | Sojka et al. |
| 2004/0087315 A1 | 5/2004 | Dufva et al. |
| 2004/0102196 A1 | 5/2004 | Weckstrom et al. |
| 2004/0114577 A1 | 6/2004 | Sojka et al. |
| 2004/0122730 A1 | 6/2004 | Tucciarone et al. |
| 2004/0142704 A1 | 7/2004 | Scholz |
| 2004/0157590 A1 | 8/2004 | Lazaridis et al. |
| 2004/0162896 A1 | 8/2004 | Cen et al. |
| 2004/0166856 A1 | 8/2004 | Niemenmaa |
| 2004/0198386 A1 | 10/2004 | Dupray |
| 2004/0202120 A1 | 10/2004 | Hanson |
| 2004/0202194 A1 | 10/2004 | Annamalai |
| 2004/0203853 A1 | 10/2004 | Sheynblat |
| 2004/0203915 A1 | 10/2004 | van Diggelen et al. |
| 2004/0224702 A1 | 11/2004 | Chaskar |
| 2004/0240430 A1 | 12/2004 | Lin et al. |
| 2004/0259566 A1* | 12/2004 | Maanoja ............... G01S 5/0018 455/456.1 |
| 2005/0003831 A1 | 1/2005 | Anderson |
| 2005/0059415 A1 | 3/2005 | Easo et al. |
| 2005/0066044 A1 | 3/2005 | Chaskar et al. |
| 2005/0070306 A1 | 3/2005 | Kim et al. |
| 2005/0075116 A1 | 4/2005 | Laird et al. |
| 2005/0079821 A1 | 4/2005 | Bi |
| 2005/0130673 A1 | 6/2005 | Annamalai |
| 2005/0136943 A1 | 6/2005 | Banerjee et al. |
| 2005/0138144 A1 | 6/2005 | Sethi |
| 2005/0148342 A1 | 7/2005 | Sylvain |
| 2005/0153687 A1* | 7/2005 | Niemenmaa ........ H04L 12/2854 455/414.2 |
| 2005/0159153 A1 | 7/2005 | Mousseau et al. |
| 2005/0170851 A1 | 8/2005 | Melpignano et al. |
| 2005/0181805 A1 | 8/2005 | Gallagher |
| 2005/0186948 A1 | 8/2005 | Gallagher et al. |
| 2005/0192024 A1 | 9/2005 | Sheynblat |
| 2005/0255866 A1 | 11/2005 | Dupuy et al. |
| 2005/0272424 A1 | 12/2005 | Gallagher et al. |
| 2005/0286466 A1 | 12/2005 | Tagg et al. |
| 2006/0009235 A1 | 1/2006 | Sheynblat et al. |
| 2006/0014517 A1 | 1/2006 | Barclay et al. |
| 2006/0014548 A1 | 1/2006 | Bolin et al. |
| 2006/0015513 A1 | 1/2006 | Poyhonen et al. |
| 2006/0025158 A1 | 2/2006 | Leblanc et al. |
| 2006/0029296 A1 | 2/2006 | King et al. |
| 2006/0030290 A1* | 2/2006 | Rudolf ................ H04W 76/007 455/404.1 |
| 2006/0052115 A1* | 3/2006 | Khushu ................ G01S 5/0263 455/456.3 |
| 2006/0062363 A1 | 3/2006 | Albrett |
| 2006/0098899 A1 | 5/2006 | King et al. |
| 2006/0105776 A1 | 5/2006 | Burke |
| 2006/0121916 A1* | 6/2006 | Aborn ............... H04M 3/42246 455/456.5 |
| 2006/0172732 A1 | 8/2006 | Nylander et al. |
| 2006/0178146 A1 | 8/2006 | Lee et al. |
| 2006/0194594 A1 | 8/2006 | Ruutu et al. |
| 2006/0212217 A1 | 9/2006 | Sheha et al. |
| 2006/0245406 A1 | 11/2006 | Shim |
| 2006/0258365 A1 | 11/2006 | Cha et al. |
| 2006/0258369 A1 | 11/2006 | Burroughs et al. |
| 2006/0276201 A1 | 12/2006 | Dupray |
| 2006/0286984 A1 | 12/2006 | Bonner |

(56) References Cited

U.S. PATENT DOCUMENTS

| | | |
|---|---|---|
| 2006/0293066 A1 | 12/2006 | Edge et al. |
| 2007/0032249 A1 | 2/2007 | Krishnamurthi et al. |
| 2007/0060097 A1 | 3/2007 | Edge et al. |
| 2007/0060114 A1 | 3/2007 | Ramer et al. |
| 2007/0061198 A1 | 3/2007 | Ramer et al. |
| 2007/0061242 A1 | 3/2007 | Ramer et al. |
| 2007/0061243 A1 | 3/2007 | Ramer et al. |
| 2007/0061244 A1 | 3/2007 | Ramer et al. |
| 2007/0061245 A1 | 3/2007 | Ramer et al. |
| 2007/0061246 A1 | 3/2007 | Ramer et al. |
| 2007/0061247 A1 | 3/2007 | Ramer et al. |
| 2007/0061303 A1 | 3/2007 | Ramer et al. |
| 2007/0061317 A1 | 3/2007 | Ramer et al. |
| 2007/0072624 A1 | 3/2007 | Niemenmaa et al. |
| 2007/0073717 A1 | 3/2007 | Ramer et al. |
| 2007/0073718 A1 | 3/2007 | Ramer et al. |
| 2007/0073719 A1 | 3/2007 | Ramer et al. |
| 2007/0073722 A1 | 3/2007 | Ramer et al. |
| 2007/0073723 A1 | 3/2007 | Ramer et al. |
| 2007/0123237 A1 | 5/2007 | Cacioppo et al. |
| 2007/0155489 A1 | 7/2007 | Beckley et al. |
| 2007/0167174 A1 | 7/2007 | Halcrow et al. |
| 2007/0178913 A1 | 8/2007 | Niemenmaa et al. |
| 2007/0189497 A1 | 8/2007 | Bareis |
| 2007/0192294 A1 | 8/2007 | Ramer et al. |
| 2007/0192318 A1 | 8/2007 | Ramer et al. |
| 2007/0198485 A1 | 8/2007 | Ramer et al. |
| 2007/0217454 A1 | 9/2007 | Horner |
| 2007/0239724 A1 | 10/2007 | Ramer et al. |
| 2007/0288427 A1 | 12/2007 | Ramer et al. |
| 2008/0009268 A1 | 1/2008 | Ramer et al. |
| 2008/0014956 A1 | 1/2008 | Balasubramanian |
| 2008/0045236 A1 | 2/2008 | Nahon et al. |
| 2008/0076420 A1 | 3/2008 | Khetawat et al. |
| 2008/0076429 A1 | 3/2008 | Comstock et al. |
| 2008/0081620 A1 | 4/2008 | Lu et al. |
| 2008/0096594 A1 | 4/2008 | Vinding |
| 2008/0108319 A1 | 5/2008 | Gallagher |
| 2008/0146245 A1 | 6/2008 | Appaji |
| 2008/0192696 A1 | 8/2008 | Sachs et al. |
| 2008/0254810 A1 | 10/2008 | Fok et al. |
| 2008/0280624 A1 | 11/2008 | Wrappe |
| 2009/0005061 A1 | 1/2009 | Ward et al. |
| 2009/0054070 A1 | 2/2009 | Gallagher et al. |
| 2009/0171583 A1 | 7/2009 | DiEsposti |
| 2009/0177730 A1 | 7/2009 | Annamalai et al. |
| 2009/0185669 A1 | 7/2009 | Zitnik et al. |
| 2009/0275348 A1 | 11/2009 | Weinreich et al. |
| 2009/0311987 A1 | 12/2009 | Edge et al. |
| 2010/0046406 A1 | 2/2010 | Annamalai et al. |
| 2010/0069099 A1 | 3/2010 | Dunn et al. |
| 2010/0150120 A1 | 6/2010 | Schlicht et al. |
| 2010/0220700 A1 | 9/2010 | Hodroj et al. |
| 2010/0289640 A1 | 11/2010 | Annamalai |
| 2010/0291947 A1 | 11/2010 | Annamalai |
| 2010/0331017 A1 | 12/2010 | Ariga |
| 2011/0039576 A1 | 2/2011 | Prakash et al. |
| 2011/0047033 A1 | 2/2011 | Mahaffey et al. |
| 2011/0051658 A1 | 3/2011 | Jin et al. |
| 2011/0051665 A1 | 3/2011 | Huang |
| 2011/0111726 A1 | 5/2011 | Kholaif et al. |
| 2011/0159886 A1 | 6/2011 | Kangas et al. |
| 2011/0200022 A1 | 8/2011 | Annamalai |
| 2012/0096490 A1 | 4/2012 | Barnes, Jr. |
| 2012/0116677 A1 | 5/2012 | Higgison et al. |
| 2012/0140749 A1 | 6/2012 | Caldwell et al. |
| 2012/0320888 A1 | 12/2012 | Annamalai et al. |
| 2013/0150085 A1 | 6/2013 | Jin et al. |
| 2013/0237250 A1 | 9/2013 | Annamalai et al. |
| 2014/0045596 A1 | 2/2014 | Vaughan |
| 2014/0295894 A1 | 10/2014 | Annamalai et al. |
| 2015/0181375 A1 | 6/2015 | Annamalai |
| 2016/0165392 A1 | 6/2016 | Caldwell et al. |

FOREIGN PATENT DOCUMENTS

| | | |
|---|---|---|
| JP | 10239416 A | 9/1998 |
| KR | 1020040063234 A | 7/2004 |
| KR | 20050031338 | 4/2005 |
| KR | 20070088455 | 8/2007 |
| WO | 2000027143 | 5/2000 |
| WO | 2005004520 A2 | 1/2005 |
| WO | 2005004528 | 1/2005 |
| WO | 2005060292 | 6/2005 |
| WO | 2006102784 A1 | 10/2006 |

OTHER PUBLICATIONS

"Google Search of Location of Mobile," http://www.google.com/search?q=location+of+mibile&sourceid=ie7&rls=com.microsoft;en-us:IE-SearchBox&ie=&oe [Last Accessed Jun. 8, 2010], 2 pages.

"IP Multimedia Subsystem," Wikipedia, http://wikipedia.org/wiki/IP_Multimedia_Subsystem, 13 pages [Last Accessed May 5, 2010].

"Secure User Plane for Location Requirements," Candidate Version 1.0, Open Mobile Alliance, Jun. 16, 2006, 80 pages.

"Secure UserPlane for Location Architecture," Candidate Version 1.0, Open Mobile Alliance, Jan. 22, 2007, 80 pages.

"The 3GPP Standard for Convergence-Diagram," UMA Universal Mobile Access, http://www.umatoday.com/img/diagrams/umaServices.jpg, [First Accessed Oct. 17, 2007], 1 page.

"The 3GPP Standard for Convergence-Dual Mode Handsets," UMA Universal Mobile Access, UMA Today, 2007, 2 pages.

"The 3GPP Standard for Convergence-Femtocells," UMA Universal Mobile Access, UMA Today, 2007, 2 pages.

"The 3GPP Standard for Convergence-Softmobiles," UMA Universal Mobile Access, UMA Today, 2007, 2 pages.

"The 3GPP Standard for Convergence—Terminal Adaptors," UMA Universal Mobile Access, UMA Today, 2007, 2 pages.

"UserPlane for Location Protocol," Candidate Version 1.0, Open Mobile Alliance, Jan. 22, 2007, 56 pages.

Annamalai, Magesh, "Method and Delivery of UMA Value Added Location Services Via SUPL," U.S. Appl. No. 60/853,086, filed Oct. 20, 2006, 15 pages.

Dyoub, J. et al., "Dueling Architectures: Control plane vs. Userplane," HP invent, 2004, 2 pages.

European Patent Office, Extended European Search Report, EP Patent Application 06826444.9, dated Sep. 12, 2012, 8 pages.

Extended European Search Report, EP Patent Application 07760606.9, dated Jan. 23, 2013, 8 pages.

Gum, Arnold et al., "Infrastructure Wireless Choices for LBS," GPS World, Mar. 2, 2006, http://www.gpsworld.com/wireless/infrastructure/wireless-choices-lbs-3750?print=1, [Last Accessed Apr. 28, 2010], 5 pages.

International Search Report and Written Opinion, International Application No. PCT/US2007/82133, Applicant: T-Mobile USA, Inc., Filed on Oct. 22, 2007, dated Apr. 29, 2008, 9 pages.

International Search Report and Written Opinion, International Application No. PCT/2006/41226, Filed on Oct. 20, 2006, Applicant: T-Mobile USA, Inc., dated Dec. 4, 2007, 18 pages.

International Search Report and Written Opinion, International Application No. PCT/2007/82156, Filed on Oct. 22, 2007, Applicant: T-Mobile USA, Inc., dated May 28, 2008, 12 pages.

International Search Report and Written Opinion, International Application No. PCT/US2007/66579, Filed on Apr. 12, 2007, Applicant: T-Mobile, Inc., dated Sep. 9, 2008, 9 pages.

International Search Report and Written Opinion, International Application No. PCT/US2007/82136, Applicant: T-Mobile USA, Inc., Filed on Oct. 22, 2007, dated Mar. 11, 2008, 11 pages.

International Search Report and Written Opinion, International Application No. PCT/US2010/035010, Applicant: T-Mobile USA, Inc., Filed on May 14, 2010, dated on Dec. 22, 2010, 10 pages.

International Search Report and Written Opinion, International Application No. PCT/US2010/035014, Applicant: T-Mobile USA, Inc., Flied on May 14, 2010, dated Dec. 28, 2010, 11 pages.

(56) References Cited

OTHER PUBLICATIONS

Martin-Escalona, et al., "Delivery of Non-Standardized Assistance Data in E-OTD/GNSS Hybrid Location Systems," IEEE 2002, pp. 1-5.

Raja, K., et al., "We Know," IEE Communication Engineer, Jun./Jul. 2004, 6 pages.

Schulzrinne et al. "Emergency Services for Internet Telephony Systems," Oct. 18, 2004, Network Working Group, Internet Draft, pp. 1-20.

Spinner, Jonathan, "Wireless Location Uses in the User Plane and Control Plane," The Location Based Services Community, Jun. 27, 2005, 3 pages.

Steinfield, "The Development of Location Based Services in Mobile Commerce," Elife after the dot.com bust, Berlin, Springer, 2004, pp. 1-15.

European Patent Office, Extended European Search Report, EP Patent Application 10775643.9, dated Dec. 1, 2016, 10 pages.

European Patent Office, Extended European Search Report, EP Patent Application 07868537.7, dated Mar. 7, 2017, 9 pages.

\* cited by examiner

MOBILE DEVICE LOCATION DETERMINATION USING MICRONETWORKS

CROSS-REFERENCES TO RELATED APPLICATIONS

This application is a continuation of U.S. patent application Ser. No. 14/225,361 filed on Mar. 25, 2015, and entitled "MOBILE DEVICE LOCATION DETERMINATION USING MICRONETWORKS," now U.S. Pat. No. 9,398,418, which is a continuation application of U.S. patent application Ser. No. 12/467,215, filed on May 15, 2009, and entitled "MOBILE DEVICE LOCATION DETERMINATION USING MICRONETWORKS," now U.S. Pat. No. 8,718,592, both of which are hereby incorporated herein in their entireties by reference.

BACKGROUND

The popularity of location-based services has substantially increased in recent years. For example, mobile device users now employ location-based services for navigation, to perform location-based searching, to receive location-based alerts or advertising, to search for or receive notification of nearby acquaintances, and/or the like. Likewise, other parties (e.g., network operators, third party location-based service providers, remote telemetry users, advertisers, etc.) may employ location-based services to enable E911 services, enable asset tracking or recovery services, provide location-based alerts or advertising, provide notification of nearby acquaintances, and/or the like.

The recent increase in the popularity of location-based services has led to the development of many different techniques to locate mobile devices. Each location determination technique may be available only with certain networks, in certain circumstances, or with certain equipment. Likewise, different location determination techniques may each provide differing levels of accuracy and/or precision. However, there are situations, such as during emergencies, where obtaining relatively accurate and precise location determinations is important.

DETAILED DESCRIPTION

A software and/or hardware facility for determining the location of a mobile device is disclosed. The facility is employed to determine the location of the mobile device when a location determination of a desired accuracy is desired. If available, the facility determines the location of the mobile device using a device-based technique or using a location determination technique that is accessible over a macronetwork. Macronetworks are networks that are designed to cover relatively large areas such as cities, metropolitan areas, regional areas, multi-state areas, and/or the like. Protocols and standards such as GSM, TDMA, UMTS, EVDO, LTE, CDMA, OFDM, GPRS, EDGE, AMPS, WiMAX, UMB, and/or the like are generally employed with macronetworks. If a location determination technique of desired accuracy is not available on the device or over a macronetwork, the facility attempts to use a location determination technique that is accessible over a micronetwork to determine the location of the mobile device. Micronetworks are networks that are designed to cover smaller areas such as neighborhoods, parks, cities, buildings, homes, and/or the like. Protocols and standards such as WiFi, GAN, UMA, Wireless Universal Serial Bus (WUSB), ZigBee, and/or the like are generally employed with micronetworks. By forcing a switch from a macronetwork-based location determination technique to a micronetwork-based location determination technique, the facility thereby ensures that a location determination of a desired accuracy is made for the mobile device.

The facility's use of a micronetwork-based location determination technique may include enabling a micronetwork interface of the mobile device, communicating with micronetworks near the mobile device, obtaining a micronetwork identifier, and determining the location of the mobile device according to the micronetwork identifier. Suitable examples of determining the location of a mobile device according to micronetwork identifiers are described in International Patent Application PCT/US2007/066579, entitled "Mobile Computing Device Geographical Location Determination," which was filed on Apr. 12, 2007; International Patent Application PCT/US2006/041226, entitled "System and Method for Determining Device Location in an IP-Based Wireless Telecommunications Network," which was filed on Oct. 20, 2006; International Patent Application PCT/US2007/082136, entitled "System and Method for Utilizing IP-Based Wireless Telecommunications Client Location Data," which was filed on Oct. 22, 2006; and International Patent Application PCT/US2007/082133, entitled "Two Stage Mobile Device Geographical Location Determination," which was filed on Oct. 22, 2006; all of which are hereby incorporated by reference in their entirety.

The facility may be employed during emergency situations to locate a mobile device. As one example, a Public Safety Answering Point (PSAP) may utilize the facility in response to an emergency services communication (e.g., a 911 call, emergency text message, distress broadcast, etc.) that is received from a mobile device. The facility determines whether a Time Difference on Arrival (TDOA) procedure (including Uplink-TDOA (U-TDOA), Observed TDOA (OTDOA), Ideal Period Downlink-OTDOA (IPDL-OTDOA), or other TDOA procedure), a Global Positioning System (GPS) procedure, an Assisted GPS (AGPS) procedure, or a Round Trip Time (RTT) procedure is available to determine the location of the mobile device. If either of the TDOA, GPS, AGPS, or RTT procedure is available, the TDOA, GPS, AGPS, or RTT procedure is employed and the geographic location of the mobile device is reported to the PSAP. If, however, neither the TDOA, GPS, AGPS, nor the RTT procedure is available, the facility causes the mobile device to attempt to communicate with nearby micronetworks. If micronetworks are detected nearby, the mobile device or the detected micronetworks may provide a micronetwork identifier to a Mobile Switching Center (MSC), Unlicensed Network Controller (UNC), or Secure User Plane Location (SUPL) system to facilitate a look-up of a geographic location associated with the micronetwork. The MSC, UNC, or SUPL system then provides the geographic location of the micronetwork to the PSAP as an indication of the location of the mobile device. Optionally, the emergency services communication from the mobile device may be handed off from the macronetwork to the micronetwork.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of the examples of the technology. It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section.

Illustrative Environments

Figure 1:
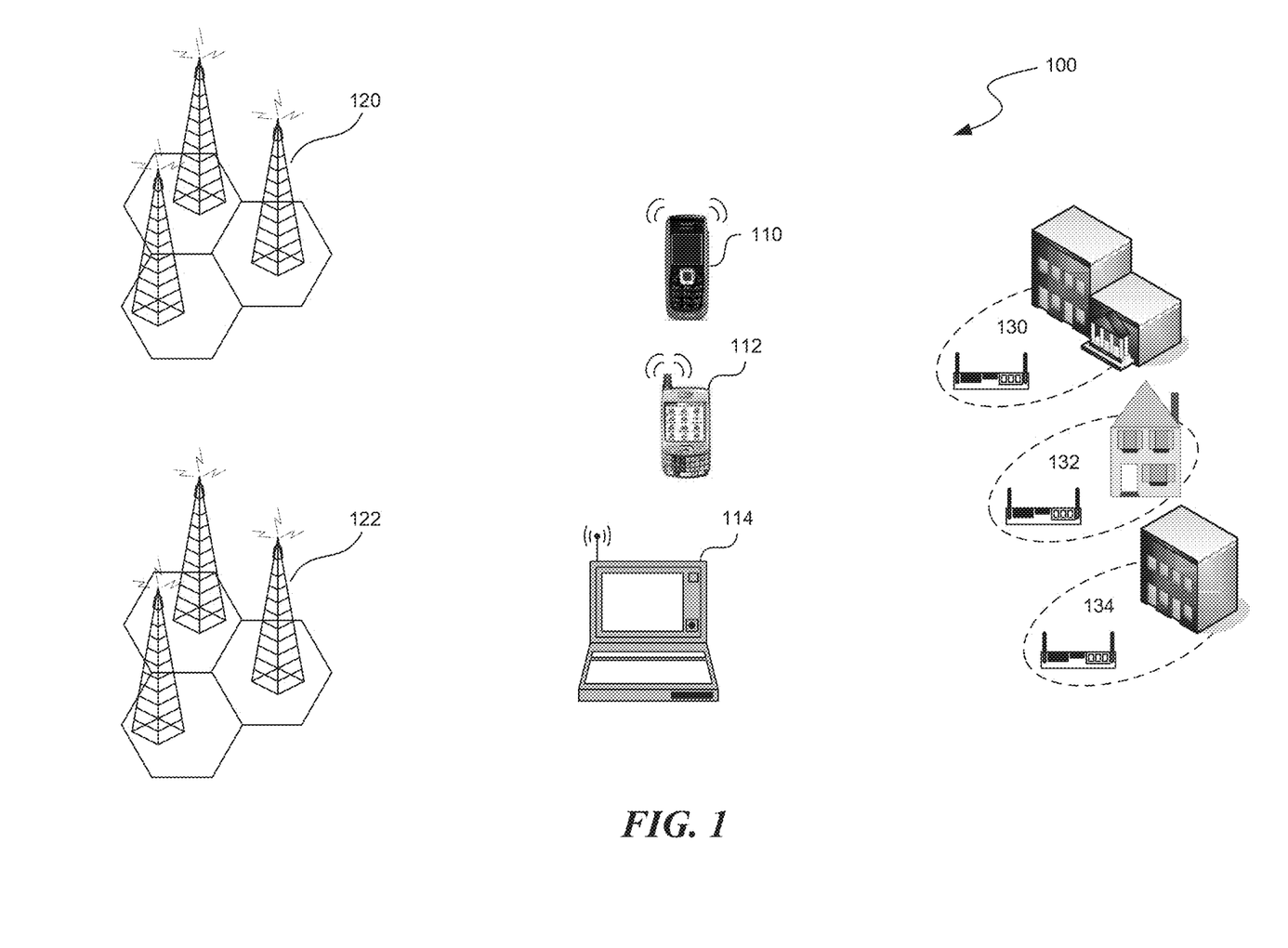
FIG. 1 is a diagram of a suitable environment for practicing aspects of the invention.

FIG. 1 illustrates an environment 100 in which the facility may be practiced. Environment 100 includes mobile devices 110, 112, and 114 and wireless networks 120, 122, 130, 132, and 134. Mobile devices 110, 112, and 114 are configured to wirelessly communicate with, or through, one or more of networks 120, 122, 130, 132, and 134.

Mobile devices 110, 112, and 114 may include virtually any devices for communicating over a wireless network. Such devices include cellular telephones, Global System for Mobile Communications (GSM) telephones, Time Division Multiple Access (TDMA) telephones, Universal Mobile Telecommunications System (UMTS) telephones, Evolution-Data Optimized (EVDO) telephones, Long Term Evolution (LTE) telephones, Secure User Plane Location (SUPL) Enabled Terminals (SETs), Generic Access Network (GAN) telephones, Unlicensed Mobile Access (UMA) telephones, Voice over Internet Protocol (VoIP) devices, other mobile telephones, Personal Digital Assistants (PDAs), radio frequency (RF) devices, infrared (IR) devices, handheld computers, laptop computers, wearable computers, tablet computers, pagers, integrated devices combining one or more of the preceding devices, and/or the like. As such, mobile devices 110, 112, and 114 may range widely in terms of capabilities and features. For example, a mobile telephone may have a numeric keypad and the capability to display only a few lines of text. However, other mobile devices (e.g., smart phones) may have a touch-sensitive screen, a stylus, and a relatively high-resolution display.

Users may employ mobile devices 110, 112, and 114 to communicate with other users or devices. In addition, users may employ mobile devices 110, 112, and 114 to receive, provide, or otherwise interact with location-based services such as E911 services, asset tracking or recovery services, location-based alerts or advertising services, social networking services such as identification of nearby friends and family, and/or the like. Location-based services may be initiated via network devices or via the mobile device.

Mobile devices 110, 112, and 114 typically include a processing unit, volatile memory and/or nonvolatile memory, a power supply, one or more network interfaces, an audio interface, a display, a keypad or keyboard, a GPS receiver and/or other location determination component, and other input and/or output interfaces (not shown). The various components of mobile devices 110, 112, and 114 may be interconnected via a bus. The volatile and nonvolatile memories generally include storage media for storing information such as processor-readable instructions, data structures, program modules, or other data. Some examples of information that may be stored include basic input/output systems (BIOS), operating systems, and applications. In addition, the memories may be employed to store operational data, content, contexts, and/or the like. The memories may also store one or more applications configured to receive and/or provide messages from and/or to another device or component. These messages may also be displayed and/or stored on mobile device 110, 112, or 114. Such messages may include short message service (SMS) messages, multi-media message service (MMS) messages, instant messaging (IM) messages, enhanced message service (EMS) messages, and/or any other content directed towards a user of mobile device 110, 112, or 114. Likewise, the memories may also store one or more applications configured to receive and/or provide information to location-based services or to facilitate performance of location determination techniques. These memories may also store applications for performing location determination techniques.

Networks 120, 122, 130, 132, and 134 may include virtually any networks for facilitating communications to or from mobile devices 110, 112, and 114 using any wireless protocol or standard. These protocols or standards include GSM, TDMA, UMTS, EVDO, LTE, GAN, UMA, Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Wireless Fidelity (WiFi), Ultra Mobile Broadband (UMB), VoIP, SUPL, IP Multimedia Subsystem (IMS), and/or the like. Networks 120, 122, 130, 132, and 134 may be operated by a mobile telephony service provider, an Internet service provider, businesses, individuals, or other network operators.

In FIG. 1, networks 120 and 122 are illustrated as macronetworks, which are networks designed to cover relatively large areas such as cities, metropolitan areas, regional areas, multi-state areas, and/or the like. Protocols and standards such as GSM, TDMA, UMTS, EVDO, LTE, CDMA, OFDM, GPRS, EDGE, AMPS, WiMAX, UMB, and/or the like are generally employed with macronetworks. Further, networks 130, 132, and 134 are illustrated as micronetworks, which are networks designed to cover smaller areas such as neighborhoods, parks, cities, buildings, homes, and/or the like. To provide an example, protocols and standards such as WiFi, GAN, UMA, Wireless Universal Serial Bus (WUSB), ZigBee, and/or the like are generally employed with micronetworks.

At any given location, one or more of networks 120, 122, 130, 132, and 134 may provide overlapping coverage areas. For example, at a particular geographical location, a mobile device may be within range of a UMA network, a GSM network, a UMTS network, and an EVDO network. At another geographical location, the mobile device may be within range of the same or a different set of networks.

At times, a user of a mobile device or a party providing services to a mobile device may want to determine the location of the mobile device with relatively high accuracy. Traditionally, relatively high accuracy location determinations are performed according to a standalone GPS procedure, or macronetwork-based TDOA, GPS, AGPS, or RTT procedures. In situations where none of these procedures are readily available, however, the facility described herein attempts to determine the location of the mobile device based on micronetworks within communications range of the mobile device.

Illustrative Communications System

Figure 2:
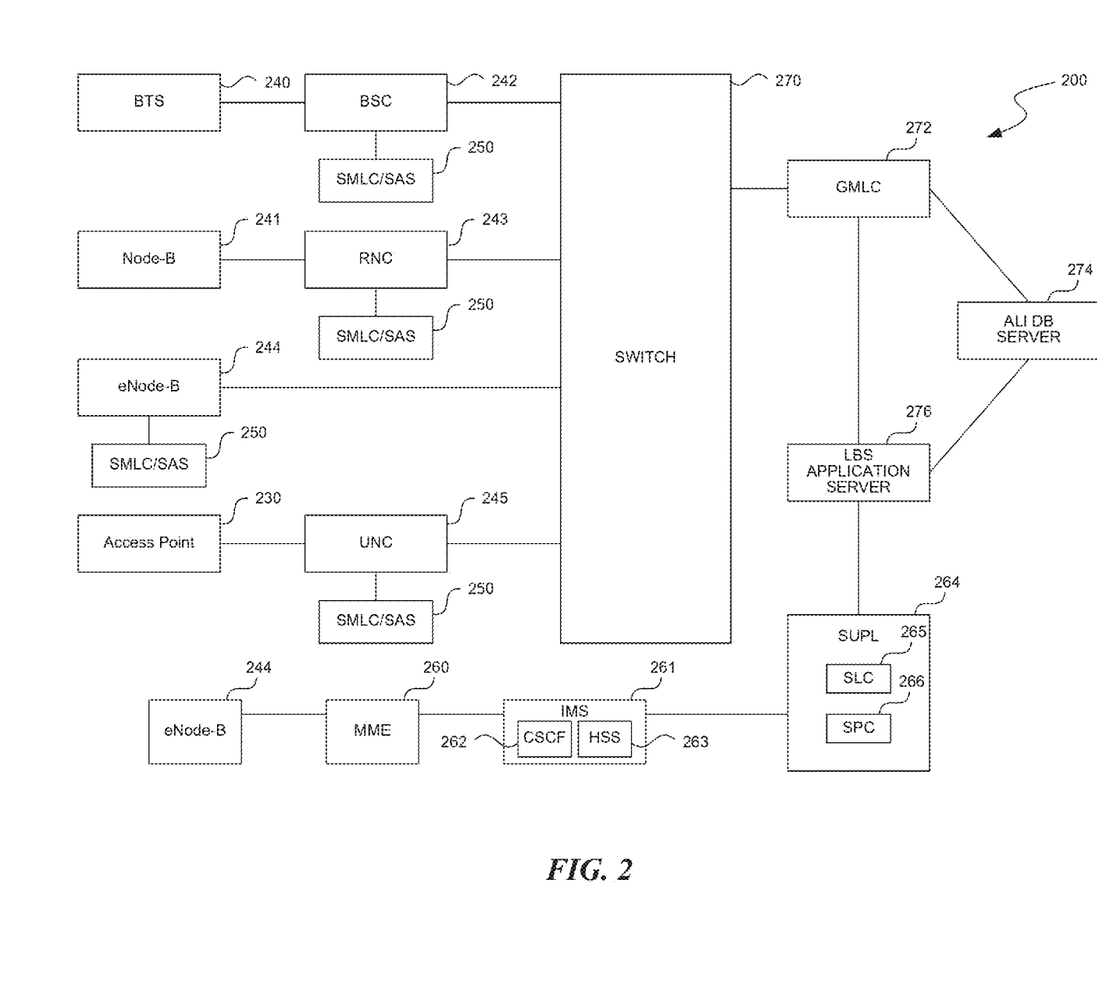
FIG. 2 is a block diagram of a suitable communications system for practicing aspects of the invention.

FIG. 2 illustrates a communications system 200, in which the facility may operate. Communications system 200 includes a base station (BTS) 240, a Node-B 241, a Base Station Controller (BSC) 242, a Radio Network Controller (RNC) 243, eNode-Bs 244, an access point 230, an Unlicensed Network Controller (UNC) 245, Serving Mobile Location Centers (SMLC)/Standalone Assisted GPS SMLCs (SAS) 250, a Mobility Management Entity (MME) 260, an IP Multimedia Subsystem (IMS) 261, a Secure User Plane Location (SUPL) system 264, a switch 270, a Gateway Mobile Location Center (GMLC) 272, an Automatic Location Identification Database (ALI DB) server 274, and a Location-Based Service (LBS) application server 276. While communications system 200 is illustrated and described in terms of GSM/GPRS/UMTS/LTE/UMA network components and architecture, the facility is not limited to such technologies. Any suitable communications system may employ all or part of the facility described herein.

In an example of a GSM/GPRS/EDGE/UMTS communications system, BTS 240 and Node-B 241 are configured to provide a low-level radio interface to mobile devices under the control of BSC 242 and RNC 243. For example, BTS 240 may provide low-level GSM radio interfacing while Node-B 241 provides low-level GPRS and/or UMTS radio interfacing. In such an example, BTS 240 and Node-B 241 include limited command and control functionality or no command and control functionality. Instead, BSC 242 and/or RNC 243 provide such functionality while BTS 240 and Node-B 241 provide physical layer interfaces to associated mobile devices. BTSs and Node-Bs may be positioned at distributed locations to provide network coverage throughout a geographical area.

BSC 242 is coupled between switch 270 and BTS 240 to provide a voice interface to, and control certain operational aspects of, BTS 240. For example, BSC 242 may be configured to control handoffs, network registration for mobile devices, channel allocation, radio transmitter output power, and/or the like. BSC 242 may be employed to control any number of BTSs.

Similarly, RNC 243 is coupled between switch 270 and Node-B 241 to provide a data interface to, and control certain operational aspects of, Node-B 241. Also, RNC 243 may be employed to control any number of Node-Bs. As one example, RNC 243 is employed in a UMTS system.

One instance of eNode-B 244 is coupled to switch 270 to interface mobile devices directly to switch 270. As one example, this instance of eNode-B 244 is employed as a consolidated LTE counterpart of BTS 240, Node-B 241, BSC 242, and RNC 243. A second instance of eNode-B 244 may be employed in an IMS/SUPL communications system and be configured to provide radio access network (RAN) functionality in order to interface mobile devices to MME 260, as discussed below.

BTS 240, Node-B 241, eNode-Bs 244, or virtually any other components or devices positioned at distributed locations to provide wireless network coverage throughout a geographical area may be referred to as a cell site. In certain instances, cell sites may also include other components such as BSCs, RNCs, SMLC/SASs, switches, MMEs, and/or the like.

An access point 230 may also serve to route communications between mobile devices and other network components (e.g., UNC 245) over an IP-based network. An access point typically provides coverage for a relatively small area, such as for a femtocell within a building (e.g., home, office, shopping mall, train station, or the like) or within an aircraft, ship, train, or other vehicle. Access point 230 may take the form of a WiFi access point, a HotSpot component, a wireless router, a wireless access point, and/or the like. One or more access points may be coupled to UNC 245 or another network component.

Access point 230 is included, for example, in IP-based network implementations of communications system 200. Such IP-based network implementations may take the form of a VoIP broadcast architecture, UMA or GAN broadcast architecture, femtocell broadcast architecture, and/or the like. As used herein, VoIP is a telecommunication system for the transmission of voice over the Internet or other packet-switched networks, and UMA is a commercial name of the 3rd Generation Partnership Project (3GPP) GAN standard. Somewhat like VoIP, UMA/GAN is a telecommunication system that extends services, voice, data, and IP Multimedia Subsystem/Session Initiation Protocol (IMS/SIP) applications over IP-based networks. For example, a common application of UMA/GAN is in a dual-mode handset service in which mobile device users can roam and handoff between local area networks and wide area networks using a GSM/WiFi dual-mode mobile phone. UMA/GAN enables the convergence of mobile, fixed, and Internet telephony, which is sometimes called Fixed Mobile Convergence.

Picocell access points may also be referred to as cell sites. Picocell access points typically cover a relatively small area, such as an area within a building (e.g., home, office, shopping mall, train station, or the like), a vehicle (e.g., within an aircraft, ship, train, or the like), or other location. A picocell access point is analogous to a WiFi access point, except that the picocell access point communicates with mobile devices over the licensed spectrum of an associated wireless carrier. A picocell access point serves as an access point for routing communication between mobile devices and other network components, e.g., BSC 242 or UNC 245, over IP-based networks, dedicated connections (e.g., T1 connections, OC3 connections, etc.), frame relay connections, microwave connections, and/or the like.

UNC 245 is coupled between switch 270 and one or more access points to interface the access points to switch 270. As one example, UNC 245 may be a UMA/GAN counterpart of RNC 243. In addition, a Generic Access Network Controller (GANC) may be suitably employed as UNC 245.

As shown, each of BTS 240, Node-B 241, BSC 242, RNC 243, and an instance of eNode-B 244 are coupled to instances of Serving Mobile Location Centers (SMLC) and/or Standalone Assisted GPS SMLCs (SAS) 250. Suitable SMLCs are configured to provide and/or coordinate location determination or estimation. In addition, suitable SASs may additionally include AGPS equipment and be configured to provide AGPS location determination or estimation. As one example, SMLC/SAS 250 may also be configured to select and/or employ location determination techniques.

In addition, MME 260 is coupled between an IMS/SUPL instance of eNode-B 244 and SUPL system 264. MME 260 functions as a node in an LTE/IMS/SUPL communications system to provide core network control and/or other functionality. MME 260 may be a MME as described by the System Architecture Evolution (SAE) standards available from the 3rd Generation Partnership Project (3GPP), such as by TS 23.401.

An IMS 261 is coupled between MME 260 and SUPL system 264 and interacts with other network components to provide IP services to a mobile device. As illustrated, IMS 261 includes Call Session Control Function (CSCF) 262 and Home Subscriber Server (HSS) 263. IMS 261, CSCF 262, and HSS 263 may respectively be an IMS, CSCF, and HSS as described by the IMS specifications of the 3GPP, 3rd Generation Partnership Project 2 (3GPP2), Telecoms and Internet Converged Services and Protocols for Advanced Networks (TISPAN), or other standards organizations.

SUPL system 264 is coupled between IMS 261 and LBS application server 276 and is configured to select, employ, and/or facilitate location determination techniques and/or location-based services. As illustrated, SUPL system 264 includes SUPL Location Center (SLC) 265 and SUPL Positioning Center (SPC) 266. Each of SUPL system 264, SLC 265, and SPC 266 may be as described by the SUPL standards available from the Open Mobile Alliance (OMA).

Switch 270 is configured to provide voice and data interfaces, as appropriate, to BSC 242, RNC 243, eNode-B 244, and UNC 245. Switch 270 may be configured to switch voice traffic from one or more base station controllers to a Public Switched Telephone Network (PTSN) or to a telephone switch such as a 5ESS switch, a PBX switch, and/or the like. Likewise, switch 270 may be further configured to switch data from one or more RNCs to a data network, to a router, to another switch, and/or the like. Also, switch 270 may include a Mobile Switching Center (MSC), a media gateway, a call gateway, and/or the like.

Switch 270 is also coupled to GMLC 272, which is coupled to ALI DB server 274 and LBS application server 276. Switch 270 and or GMLC 272 may be configured to select, employ, and/or facilitate location determination techniques and/or location-based services. LBS application server 276 may communicate with ALI DB server 274 and/or GMLC 272 to receive location determination information or to perform a location determination.

In one example, LBS application server 276 is configured as, or to provide location information to, a PSAP, e.g., as part of an E911 service. However, LBS application server 276 may also be configured to provide location information to any other entity or for any other purpose. For example, LBS application server 276 may be configured to provide location information to mobile device users, network operators, third party location-based service providers, remote telemetry users, advertisers, and/or the like. Likewise, LBS application server 276 may instead be an LBS client such as a PSAP, LBS application, user device, and/or the like.

While FIGS. 1 and 2 illustrate specific examples of suitable environments and communications systems in which the facility may operate, various modifications such as the inclusion of additional components, consolidation and/or deletion of various components, and shifting of functionality from one component to another may be made without deviating from the invention.

Illustrative Logical Flow Diagrams

Figure 3:
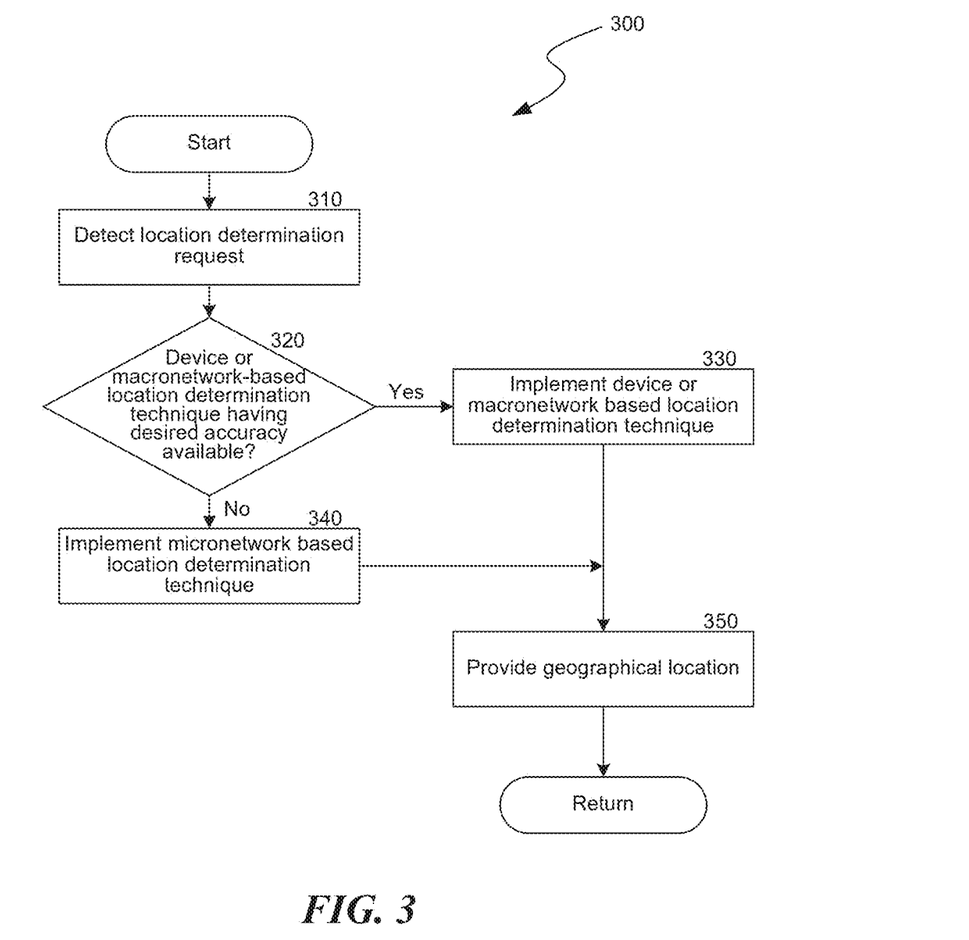
FIG. 3 is a logical flow diagram of a process for determining the location of a mobile device.
Figure 4:
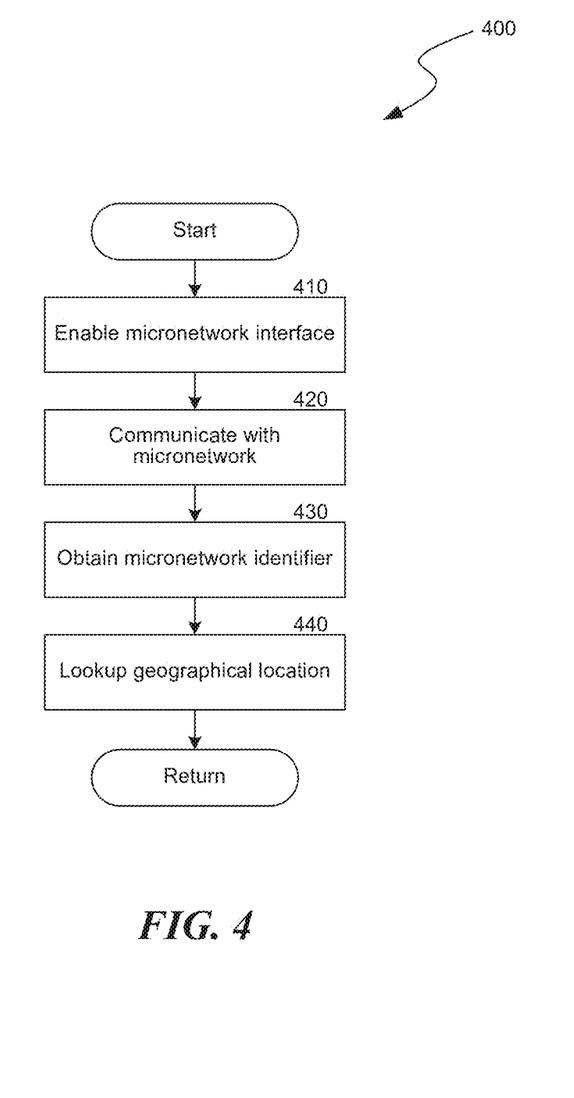
FIG. 4 is a logical flow diagram of a process for implementing a micronetwork-based location determination technique.

FIG. 3 is a logical flow diagram of process 300 that is implemented by the facility for determining the location of a mobile device. FIG. 4 is a logical flow diagram of process 400 that is used by the facility to implement a micronetwork-based location determination technique. For clarity, processes 300 and 400 are described below as being performed by SUPL system 264 of FIG. 2. For example, processes 300 and 400 may be performed wholly or partially by SLC 265 and/or SPC 266 of SUPL system 264. However, processes 300 and 400 may also be, for example, performed on mobile devices 110, 112, or 114, SMLC/SAS 250, Node-B 241, switch 270, LBS application server 276, and/or on or by other processors, other components, or other systems, whether or not such processors, components, or systems are described herein. Further, instructions causing processes 300 and 400 to be executed may be stored in nonvolatile memory.

Flowing from a start block, processing starts at step 310 where SUPL system 264 detects a location determination request. For example, a location determination request may be detected by SUPL system 264 in response to a message from eNode-B 244 or MME 260 representing initiation of an emergency services communication from mobile device 110. From step 310, processing flows to decision block 320.

At decision block 320, SUPL system 264 determines whether a device or macronetwork-based location determination technique having a desired accuracy is available. In general, the SUPL system makes this determination by assessing whether the mobile device and at least one macronetwork with which mobile device 110 is currently associated are capable of employing or facilitating a location determination technique expected to provide the desired accuracy. As one example, a device or macronetwork-based location determination technique is available if mobile device 110 is capable of performing a GPS location determination having a desired accuracy. As another example, a device or macronetwork-based location determination technique is available if mobile device 110 and a macronetwork with which it is associated are capable of performing a TDOA, GPS, AGPS, or RTT location determination having the desired accuracy, time to fix (TTF), and/or yield (e.g., expected or actual percentage of successful and/or valid location determinations). The desired accuracy, TTF, and/or yield may depend on the particular application that requires the location determination. In certain emergency applications, for example, the desired accuracy is achieved when an implemented location determination technique is expected to determine the location of the mobile device within no more than 20 meters of the actual location of the mobile device. Also, the desired accuracy, TTF, and/or yield may be configured by a network operator, by the PSAP, or by other parties. Also, the desired accuracy, TTF, and/or yield may be inferentially defined by manually selecting or configuring device and/or macronetwork based location determination techniques expected to provide the desired levels.

If a device or macronetwork-based location determination technique having the desired accuracy, TTF, and/or yield is determined to be available by the SUPL system, processing flows to step 330 where the device or macronetwork-based location determination technique is implemented and/or employed to determine the location of mobile device 110. For example, the location of mobile device 110 may be determined by implementing a TDOA, GPS, AGPS, RTT, or other device or macronetwork-based location determination technique. From step 330, processing flows to step 350.

At step 350, the location of mobile device 110 is provided to the requesting party, such as to a PSAP (e.g., to enable the dispatch of emergency response) or to a user of mobile device 110. The location of mobile device 110 may alternatively, or additionally, be provided to another party, device, entity, or component. For example, the location of mobile device 110 may be provided to another location-based service, to a remote party, to a network operator, and/or the like. From step 350, processing ends or returns to other actions.

Returning to decision block 320, if the SUPL system determines that a device or macronetwork-based location determination technique having a desired accuracy, TTF, and/or yield is not available, processing flows to step 340 where the SUPL system causes a micronetwork-based location determination technique to be implemented. A representative micronetwork-based location determination technique is described in process 400 of FIG. 4.

At step 410 of FIG. 4, SUPL system 264, via IMS 261, MME 260, and eNode-B 244, may instruct mobile device 110 to enable a micronetwork interface. Alternatively, e.g., if the processing reflected by decision block 320 is performed on mobile device 110, the mobile device may independently enable the micronetwork interface. Also, the enabling of the mobile device's micronetwork interface may be forced from a network component, may occur automatically without prompting or receiving input from a user of the mobile device, or may require prompting and receiving confirmation from a user of mobile device before proceeding. Such selective enabling of the mobile device's micronetwork interface may reduce power consumption during non-emergency situations, while still providing the flexibility and/or benefits of micronetworks during emergency situations. From step 410, processing flows to step 420.

At step 420, mobile device 110 communicates with, or attempts to communicate with, in-range micronetworks. For example, mobile device 110 may scan and/or search for micronetworks that are geographically near the mobile device and/or for micronetworks that are within range of the current location of the mobile device. Step 420 may be initiated by the mobile device in response to a command from SUPL system 264, switch 270, BTS 240, and/or other network component.

Step 420 may also or alternatively include broadcasting and/or otherwise transmitting a distress message from mobile device 110 to one or more micronetwork access points, attempting a handoff and/or registration with a micronetwork access point, and/or the like. For example, by broadcasting a distress message, mobile device 110 may enable its location to be determined even if it is unable to establish two-way communications with a micronetwork (e.g., if the micronetwork signal is weak, interference is present, the micronetwork employs access control or encryption, etc.).

Processing then flows to step 430 where SUPL system 264 and/or another network component (e.g., UNC 245 and/or switch 270) obtains a micronetwork identifier of a micronetwork near mobile device 110. The micronetwork identifier may include an Internet Protocol (IP) address, a Media Access Control (MAC) address, a Service Set Identifier (SSID), an International Mobile Subscriber Identity (IMSI), an International Mobile Equipment Identity (IMEI), a serial number, a machine name (e.g., fully qualified domain name, hostname, domain name, etc.), and/or the like. As one example, the micronetwork identifier is provided to SUPL system 264 and/or the other network component from mobile device 110 via the micronetwork and via the Internet. As another example, the micronetwork identifier may be communicated to SUPL system 264 and/or the other network component from the micronetwork access point with which mobile device 110 communicated, from UNC 245, or from the other micronetwork or macronetwork component. The micronetwork identifier may be communicated to SUPL system 264 and/or the other network component through any suitable communications channel including through the macronetwork, the micronetwork, the Internet, and/or the like.

From step 430, processing flows to step 440 where SUPL system 264 and/or the other network component looks up a geographical location associated with the received micronetwork identifier. For example, the geographical location associated with the micronetwork identifier may be looked up as described in International Patent Application PCT/US2007/066579, entitled "Mobile Computing Device Geographical Location Determination," which was filed on Apr. 12, 2007; International Patent Application PCT/US2006/041226, entitled "System and Method for Determining Device Location in an IP-Based Wireless Telecommunications Network," which was filed on Oct. 20, 2006; International Patent Application PCT/US2007/082136, entitled "System and Method for Utilizing IP-Based Wireless Telecommunications Client Location Data," which was filed on Oct. 22, 2006; and International Patent Application PCT/US2007/082133, entitled "Two Stage Mobile Device Geographical Location Determination," which was filed on Oct. 22, 2006. The geographical location may be defined by a latitude, longitude, altitude, address, and/or the like. As one example, the geographical location is an address at which a micronetwork access point is installed.

Returning to FIG. 3, following the implementation of a location determination technique by either a micronetwork-based location determination technique, processing continues to step 350 where the location of mobile device 110 is indicated to the requesting party, such as to a PSAP (e.g., to enable the dispatch of emergency response), to a user of mobile device 110, or to another party, device, entity, or component.

By employing process 300, the facility may enable accurate and/or reliable location determination in situations in which less accurate location determinations would otherwise have been employed. For example, during emergencies, process 300 may enable faster dispatch of emergency service personnel, less time before emergency service personnel are on-site, and/or the like.

Illustrative Control Flow Diagrams

Figure 5:
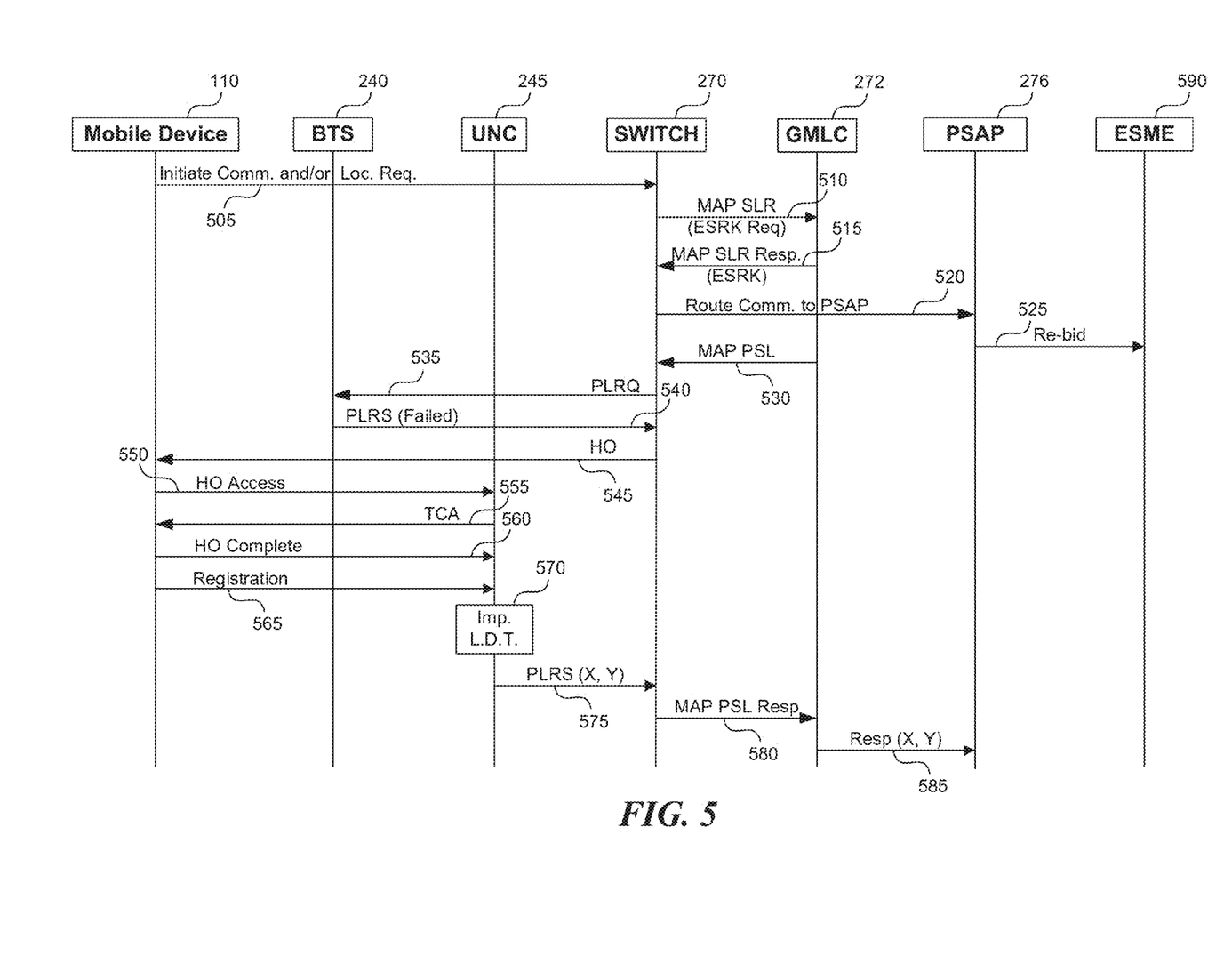
FIG. 5 is a control flow diagram illustrating the transfer of information between system components when an emergency services communication is initiated from a mobile device.

FIG. 5 is a control flow diagram illustrating the transfer of information between system components when an emergency services communication is initiated from mobile device 110 and no device or macronetwork-based location determination technique is available to determine the location of the mobile device. Although FIG. 5 is described with reference to a mobile-device-initiated emergency services communication, aspects of the described technology may also be employed with other mobile device communications. For clarity, FIG. 5 is described as involving specific communications between specific mobile devices and network components, and FIG. 5 is illustrated and described in terms of GSM/UMTS/UMA network components and architecture. However, the technology is not limited to the described example. The control flow is described below with reference to processing steps 505-585.

Step 505: An emergency services communication and/or location determination request is initiated from mobile device 110 to switch 270. The emergency services communication and/or location request may be routed to switch 270 via, for example, BTS 240, BSC 242, eNode-B 244, and/or the like.

Step 510: Switch 270 sends a Mobile Application Protocol (MAP) Subscriber Location Response (SLR) message to GMLC 272. The MAP SLR message may include a request for an Emergency Services Return Key (ESRK).

Step 515: GMLC 272 sends a MAP SLR response to switch 270. The MAP SLR response may include an ESRK, e.g., if an ESRK was requested in step 510.

Step 520: Switch 270 routes the emergency services communication to PSAP 276 such that mobile device 110 and PSAP 276 can initiate the emergency services communication. In this example, LBS application server 276 of FIG. 2 is a PSAP.

Step 525: PSAP 276 may send a re-bid or Auto Location Identification (ALI) request to an Emergency Services Messaging Entity (ESME) 590, e.g., to indicate that PSAP 276 is awaiting the location of mobile device 110 and/or a more accurate location of mobile device 110.

Step 530: GMLC 272 sends a MAP Provide Subscriber Location (PSL) message to switch 270. For example, the MAP PSL message may be sent to indicate that GMLC 272 is requesting a more accurate determination of mobile device 110's location.

Step 535: Switch 270 sends a Platform Location Request (PLRQ) message to BTS 240. For example, the PLRQ message may represent a request to determine whether a device or macronetwork-based location determination technique is available that meets a desired level of accuracy to determine the location of mobile device 110.

Step 540: BTS 240 (or alternately Node-B eNode-B, etc.) sends a Platform Location Response (PLRS) message to switch 270. In this example, the PLRS message is a failure message indicating that no device or macronetwork-based location determination technique is available to determine the location of the mobile device. Such a failure message may be generated if the available device or macronetwork techniques do not meet a desired level of accuracy, TTF, and/or yield, if the location of mobile device 110 is not available, or if the location is not accurate for other reasons such as a lack of network or mobile device resources, an error or startup condition, insufficient data, and/or the like.

Step 545: Switch 270 transmits a Handoff (HO) or other command to mobile device 110 to cause the device to initiate a micronetwork-based location determination technique. For example, switch 270 may transmit a command for mobile device 110 to enable a micronetwork interface and/or to search for nearby micronetworks.

Step 550: After locating an available micronetwork, mobile device 110 transmits a HO access message to UNC 245.

Step 555: UNC 245 (such as a GANC) sends a Traffic Channel Assignment (TCA) message to mobile device 110 to indicate a traffic channel assignment for continuing the emergency services communications via the micronetwork.

Step 560: Mobile device 110 sends a HO complete message to UNC 245.

Step 565: Mobile device 110 transmits a registration message to UNC 245. At this point, the emergency services communications have been handed off from the macronetwork to the micronetwork. While steps 545, 550, 555, 560, and 565 represent a process whereby an emergency services communication is automatically handed off from a macronetwork to a micronetwork as a forced handoff, in other examples the emergency services communications may continue over the macronetwork after mobile device 110 has communicated with a micronetwork access point. For example, mobile device 110 may transmit or broadcast a distress message to one or more micronetwork access points in order to allow the location of the mobile device to be determined based on the access point identifier. During and after transmission of the distress message, however, the mobile device may continue with the primary communication session established with emergency services over the macronetwork.

Step 570: UNC 245 determines the location of mobile device 110 utilizing information associated with the micronetwork. For example, step 570 may include steps 430 and 440 of FIG. 4 and may be based on information included in the registration message of step 565. However, step 570 may also include other techniques for determining the location of a mobile device according to a micronetwork; e.g., using any of the techniques in the references that are incorporated by reference herein.

Step 575: UNC 245 sends a PLRS message to switch 270. In this instance, the PLRS message includes the geographical location of mobile device 110 as determined by UNC 245 at step 570.

Step 580: Switch 270 transmits a MAP PSL response to GMLC 272.

Step 585: GMLC 272 sends a response message including the geographical location to PSAP 276. PSAP 276 may then forward the geographical location to another component or entity and/or employ the geographical location to dispatch emergency services or provide other location-based services.

CONCLUSION

Unless the context clearly requires otherwise, throughout the description and the claims, the words "comprise," "having," "include," and the like, and conjugates thereof, are to be construed in an inclusive sense, as opposed to an exclusive or exhaustive sense; that is to say, in the sense of "including, but not limited to." As used herein, the term "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description that are singular or plural may also be deemed to include plural or singular forms, respectively. The word "or," in reference to a list of two or more items, covers all of the following interpretations of the word: any of the items in the list, all of the items in the list, and any combination of the items in the list. The terms "based on," "according to," and the like are not exclusive and are equivalent to the term "based, at least in part, on," "at least according to," or the like and include being based on, or in accordance with, additional factors, whether or not the additional factors are described herein.

The above Detailed Description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps, or employ systems having steps, in a different order, and some processes or steps may be deleted, moved, added, subdivided, combined, and/or modified to provide alternative or subcombinations. Each of these processes or steps may be implemented in a variety of different ways. Also, while processes or steps are at times shown as being performed in series, these processes or steps may instead be performed in parallel, or may be performed at different times.

Any patents and applications and other references noted above, including any that may be listed in accompanying filing papers, are incorporated herein by reference. While certain aspects of the invention are presented below in certain claim forms, the applicant contemplates the various aspects of the invention in any number of claim forms. For example, while only one aspect of the invention is recited as a means-plus-function claim under 35 U.S.C. §112, ¶6, other aspects may likewise be embodied as a means-plus-function claim, or in other forms, such as being embodied in a processor-readable medium. (Any claims intended to be treated under 35 U.S.C. §112, ¶6 will begin with the words "means for." Use of the term "for" in any other context is not intended to invoke treatment under 35 U.S.C. §112, ¶6.) Accordingly, the applicant reserves the right to add additional claims after filing the application to pursue such additional claim forms for other aspects of the invention.

What is claimed is:

1. A computer-implemented method for determining a geographic location of a dual-mode mobile device, the method comprising:
    establishing, through a first network interface of the dual-mode mobile device, a communication session with a macronetwork,
    wherein the communication session with a macronetwork is established using a first protocol;
    evaluating, by communicating with the macronetwork, whether a geographic location of the dual-mode mobile device, satisfying a location determination criteria, can be obtained from the macronetwork; and following the evaluating that the macronetwork-obtained location of the dual-mode mobile device would fail the location determination criteria, obtaining location information by:
    broadcasting, through a second network interface of the dual-mode mobile device using a second protocol distinct from the first protocol, a distress message to a micronetwork,
    wherein the broadcasting of a distress message to a micronetwork enables the location information to be obtained regardless of whether a two-way communication session Is established with the micronetwork:
    maintaining, at the mobile device, the communication session with the macronetwork through the first network interface of the dual-mode mobile device using the first protocol; receiving an identifier from the micronetwork; and retrieving location information based on the received identifier.

2. The method of claim 1, wherein the location determination criteria are failed when at least one of an accuracy, a time-to-fix, and a yield associated with the macronetwork-obtained location fails to satisfy a desired accuracy, a desired time-to-fix, or a desired yield associated with the dual-mode mobile device.

3. The method of claim 2, wherein the desired accuracy is an accuracy within 20 meters of the actual location of the dual-mode mobile device.

4. The method of claim 1, wherein the micronetwork is distinct from the macronetwork.

5. The method of claim 1, wherein the method is performed, at least in part, at a switch or at a Secure User Plane Location (SUPL).

6. The method of claim 1, wherein a macronetwork-based location determination technique associated with the macronetwork-obtained location comprises one of a Global Positioning System, Time Delay On Arrival (TDOA), an Assisted Global Positioning System (AGPS), and a Round Trip Time (RTT) technique.

7. The method of claim 1, further comprising providing the retrieved location information as an indication of the location of the dual-mode mobile device to a Public Safety Answering Point (PSAP).

8. The method of claim 1,
    wherein communicating with the macronetwork comprises communicating through at least one of the Global System for Mobile Communication (GSM), Time Division Multiple Access (TDMA), Universal Mobile Telecommunication System (UMTS), Evolution-Data Optimized (EVDO), Long-Term Evolution (LTE), Code Division Multiple Access (CDMA), Orthogonal Frequency-Division Multiplexing (OFDM), General Packet Radio Service (GPRS), Enhanced Data GSM Environment (EDGE), Advanced Mobile Phone System (AMPS), Worldwide Interoperability for Microwave Access (WiMax), and Ultra Mobile Broadband (UMB) protocols, and
    wherein broadcasting with the micronetwork comprises communicating through at least one of the Wireless Fidelity (WiFi), General Access Network (GAN), Unlicensed Mobile Access (UMA), Wireless Universal Serial Bus (WUSB), and ZigBee protocols.

9. A system configured for determining a physical location of a dual-mode mobile device, the system comprising:
    at least one physical processor;
    at least one memory storing instructions, which when executed by the at least one processor, performs a method for—
    establishing, through a first network interface of the dual-mode mobile device using a first protocol, a communication session with a macronetwork;
    evaluating, by communicating with the macronetwork, whether a physical location of the dual-mode mobile device, satisfying a location determination criteria, can be obtained from the macronetwork; and
    following the evaluating that the macronetwork-obtained location would fail the location determination criteria, obtaining location information by:
        broadcasting, through a second network interface of the dual-mode mobile device using a second protocol distinct from the first protocol, a distress message to a micronetwork,
            wherein the broadcasting enables the location information to be obtained regardless of whether a two-way communication session is established with the micronetwork;
        maintaining, at the dual-mode mobile device, the communication session with the macronetwork through the first network interface of the dual-mode mobile device using the first protocol;
        receiving an identifier from the micronetwork; and
        retrieving location information based on the received identifier.

10. The system of claim 9, wherein the location determination criteria are failed when at least one of an accuracy, a time-to-fix, and a yield associated with the macronetwork-obtained location fails to satisfy a desired accuracy, a desired time-to-fix, or a desired yield associated with the dual-mode mobile device, and wherein the desired accuracy is an accuracy within 20 meters of the actual location of the dual-mode mobile device.

11. The system of claim 9, wherein a macronetwork-based location determination technique associated with the macronetwork-obtained location comprises one of a Global Positioning System, Time Delay On Arrival (TDOA), an Assisted Global Positioning System (AGPS), and a Round Trip Time (RTT) technique.

12. A non-transitory computer-readable medium comprising instructions configured to cause one or more processors to perform a method for determining a location of a dual-mode mobile device, the method comprising:
  establishing, through a first network interface of the dual-mode mobile device using a first protocol, a communication session with a macronetwork;
  evaluating, by communicating with the macronetwork, whether a location of the dual-mode mobile device, satisfying a location determination criteria, can be obtained from the macronetwork; and
  obtaining, following the evaluating that the macronetwork-obtained location would fail the location determination criteria, location information by:
    transmitting, through a second network interface of the dual-mode mobile device using a second protocol distinct from the first protocol, an alert message to the micronetwork,
      wherein the transmitting of the alert message to the micronetwork enables the location information to be obtained regardless of whether a two-way communication session is established with the micronetwork;
    maintaining, at the dual-mode mobile device, the communication session with the macronetwork through the first network interface of the dual-mode mobile device using the first protocol;
    receiving an identifier from the micronetwork; and
    retrieving location information based on the received identifier.

13. The non-transitory computer-readable medium of claim 12, wherein the location determination criteria are failed when at least one of an accuracy, a time-to-fix, and a yield associated with the macronetwork-obtained location fails to satisfy a desired accuracy, a desired time-to-fix, or a desired yield associated with the dual-mode mobile device.

14. The non-transitory computer-readable medium of claim 13, wherein the desired accuracy is an accuracy within 20 meters of the actual location of the dual-mode mobile device.

15. The non-transitory computer-readable medium of claim 12, wherein the micronetwork is distinct from the macronetwork.

16. The non-transitory computer-readable medium of claim 12, wherein the method is performed, at least in part, at a switch or at a Secure User Plane Location (SUPL).

17. The non-transitory computer-readable medium of claim 12, wherein a macronetwork-based location determination technique associated with the macronetwork-obtained location comprises one of a Global Positioning System, Time Delay On Arrival (TDOA), an Assisted Global Positioning System (AGPS), and a Round Trip Time (RTT) technique.

18. The non-transitory computer-readable medium of claim 12, further comprising providing the retrieved location information as an indication of the location of the dual-mode mobile device to a Public Safety Answering Point (PSAP).

19. The non-transitory computer-readable medium of claim 12,
  wherein communicating with the macronetwork comprises communicating through at least one of the Global System for Mobile Communication (GSM), Time Division Multiple Access (TDMA), Universal Mobile Telecommunication System (UMTS), Evolution-Data Optimized (EVDO), Long-Term Evolution (LTE), Code Division Multiple Access (CDMA), Orthogonal Frequency-Division Multiplexing (OFDM), General Packet Radio Service (GPRS), Enhanced Data GSM Environment (EDGE), Advanced Mobile Phone System (AMPS), Worldwide Interoperability for Microwave Access (WiMax), and Ultra Mobile Broadband (UMB) protocols, and
  wherein transmitting to the micronetwork comprises communicating through at least one of the Wireless Fidelity (WiFi), General Access Network (GAN), Unlicensed Mobile Access (UMA), Wireless Universal Serial Bus (WUSB), and ZigBee protocols.

* * * * *